Patented Apr. 8, 1930

1,753,787

UNITED STATES PATENT OFFICE

WILHELM HIRSCHKIND, OF PITTSBURG, CALIFORNIA, ASSIGNOR TO GREAT WESTERN ELECTRO-CHEMICAL COMPANY, A CORPORATION OF CALIFORNIA

PROCESS OF RECOVERING ALKALI-METAL XANTHATES

No Drawing.   Application filed November 28, 1924.   Serial No. 752,806.

This invention relates to the manufacture of sulphur-containing organic compounds and is herein described as applied to the manufacture of potassium xanthate.

Methods of producing xanthate are well known, as by adding carbon disulphide to a solution of a caustic alkali in an alcohol, the result of which is the precipitation of crystals of the alkali xanthate in a mother liquor. This yields a precipitate of available commercial xanthate crystals, where either potassium or sodium hydroxide has been used, of about 60% to 70% of the theoretically possible yield of xanthate. The xanthate crystals thus produced are normally soluble, i. e., they are readily soluble in water.

Another known method is to dissolve the caustic alkali in water and mix this aqueous solution with a smaller amount of alcohol and carbon disulphide. This reduces the amount of alcohol needed and produces a precipitate of available commercial xanthate crystals, but also leaves about the same proportion of the theoretically possible yield of xanthate in the mother liquor. The xanthate crystals thus produced are also normally soluble.

According to the present invention a further yield of normally-soluble xanthate is obtained from the mother liquor of either of the above described processes, by adding to the mother liquor, after the separation of the precipitated xanthate therefrom, a precipitating substance such as an alkali metal hydroxide. For example there may be added to the mother liquor a substantially saturated solution of potassium hydroxide. When this procedure is followed as a second step of the process, additional potassium xanthate is obtained, often over 60% of that theoretically obtainable from the mother liquor. If caustic potash has been used for the first step, sodium hydroxide solution may be used to treat the mother liquor. This brings the total yield of the process to well over 80% of that theoretically possible. Where only sodium and potassium salts are concerned only potassium xanthate is ordinarily precipitable by the described additional treatment.

The mother liquor still remaining is a valuable auxiliary to mineral-frothing agents in the froth-flotation concentration of ores, especially for use in alkaline ore pulps. It often contains about 16% of caustic soda.

In one run according to the present invention, 408 pounds of denatured 91% ethyl alcohol were added to a kettle containing 809 pounds of 55% aqueous caustic potash solution, and the agitator of the kettle was operated to keep the materials thoroughly mixed, and the mixture was cooled to 25° C. by the water jacket of the kettle. The kettle was closed with a reflux condenser. There was then run in 618 pounds of carbon disulphide at such a rate, with the aid of the water jacket and the agitators, that the temperature did not rise above 30° C.

The final semi-solid mass was run directly into a centrifuge where the mother liquor was separated from the crystals of potassium xanthate. The crystals were further dried, finally weighing 750 pounds.

The separated mother liquor, weighing about 1085 pounds, containing the equivalent of 50% potassium xanthate, was mixed with 435 pounds of 46% caustic soda solution, added at such a rate that the water jacket was capable of keeping it cool. The resulting mass was run into a centrifuge and additional crystals of potassium xanthate weighing 300 pounds were separated from the mother liquor, making a total recovery of 1050 pounds, corresponding to a total yield of about 85% of the theoretically possible.

The 55% solution of caustic potash used is about the maximum strength that can be handled commercially. The presence of impurities somewhat reduces the solubility of the caustic potash, and if an absolutely saturated solution were used, crystallization in tanks and pipe lines would be likely to interfere with the practical manipulation of the process.

The 46% solution of caustic soda is convenient because it is of a strength commercially shipped. A 49% solution might be preferable if the solution is especially made up.

Similar procedures with methyl, butyl and amyl alcohols in place of the ethyl alcohol yielded corresponding results, the proportion of xanthate recovered varying generally with the solubility of the xanthate.

Having thus described certain embodiments of my invention, what I claim is:—

1. The process of obtaining alkali-metal xanthate in the form of a separable precipitate which consists in causing alcohol, caustic alkali and carbon disulphide to react to produce and precipitate a xanthate, and then causing a precipitation from the mother liquor of normally soluble potassium xanthate by the addition of a precipitant comprising an alkali-metal hydroxide, said precipitation bringing down a precipitate in excess of any precipitate due to mass action.

2. The process of obtaining in the form of a separable precipitate alkali metal xanthate, which consists in causing ethyl alcohol, caustic potash and carbon disulphide to react to produce and precipitate potassium xanthate, and adding caustic soda to precipitate a further quantity of potassium xanthate.

3. The process of obtaining in the form of a separable precipitate alkali metal xanthate, which consists in causing an alcohol to react with an aqueous solution of caustic potash and carbon disulphide to produce and precipitate normally-soluble potassium xanthate, and adding a solution of a caustic alkali to precipitate a further quantity of normally-soluble potassium xanthate in excess of any precipitation due to mass action.

4. The process of obtaining in the form of a separable precipitate alkali metal xanthate, which consists in causing ethyl alcohol to react with an aqueous solution of caustic potash and carbon disulphide to produce and precipitate normally-soluble potassium xanthate, and adding a caustic alkali to precipitate a further quantity of normally-soluble potassium xanthate in excess of any precipitation due to mass action.

In testimony whereof, I have affixed my signature to this specification.

WILHELM HIRSCHKIND.